US010840663B2

(12) United States Patent
Staubli et al.

(10) Patent No.: US 10,840,663 B2
(45) Date of Patent: Nov. 17, 2020

(54) CABLE PROCESSING DEVICE

(71) Applicant: Komax Holding AG, Dierikon (CH)

(72) Inventors: Dominik Staubli, Horw (CH); André Matter, Wilen (CH)

(73) Assignee: KOMAX HOLDING AG, Dierikon (CH)

( * ) Notice: Subject to any disclaimer, the term of this patent is extended or adjusted under 35 U.S.C. 154(b) by 229 days.

(21) Appl. No.: 15/838,431

(22) Filed: Dec. 12, 2017

(65) Prior Publication Data

US 2018/0175576 A1 Jun. 21, 2018

(30) Foreign Application Priority Data

Dec. 16, 2016 (EP) .................................... 16204680

(51) Int. Cl.

| | |
|---|---|
| ***B23P 19/00*** | (2006.01) |
| ***H01R 43/042*** | (2006.01) |
| ***H01R 43/28*** | (2006.01) |
| ***H01R 43/05*** | (2006.01) |

(52) U.S. Cl.
CPC ............. *H01R 43/28* (2013.01); *H01R 43/05* (2013.01)

(58) Field of Classification Search
CPC ................................ H01R 43/28; H01R 43/05
See application file for complete search history.

(56) References Cited

U.S. PATENT DOCUMENTS 5,157,830 A * 10/1992 Koch .................... H01R 43/20 29/33 M
6,357,575 B1 3/2002 Conte

FOREIGN PATENT DOCUMENTS

| | | | |
|---|---|---|---|
| EP | 1079479 | A1 | 2/2001 |
| EP | 1403983 | A1 | 3/2004 |
| EP | 1447888 | A1 | 8/2004 |
| EP | 1548902 | A1 | 6/2005 |
| EP | 1689049 | A1 | 8/2006 |
| EP | 2442413 | A1 | 4/2012 |
| EP | 2511213 | A1 | 10/2012 |
| EP | 3024099 | A1 | 5/2016 |
| WO | 8900348 | A1 | 1/1989 |
| WO | 9717751 | A1 | 5/1997 |
| WO | 2016181766 | A1 | 11/2016 |

* cited by examiner

*Primary Examiner* — Paul D Kim
(74) *Attorney, Agent, or Firm* — William J. Clemens; Shumaker, Loop & Kendrick, LLP

(57) ABSTRACT

A cable processing device has at least one workstation designed as a changing station for processing cable ends of cables. This changing station includes two processing modules for optionally processing the cable end of the cable in one of the processing modules. The processing modules allocated to the changing station can be adjusted between a working position and a waiting position by an adjustment mechanism. The processing modules of the changing station are arranged on a carrier that is mounted on a machine frame such that the carrier is pivotable about a vertical axis of rotation. As a result of a 180° rotation about the axis of rotation, one of the processing modules is moved from the working position to the waiting position, while the other processing module is simultaneously moved from the waiting position to the working position.

14 Claims, 4 Drawing Sheets

CABLE PROCESSING DEVICE

FIELD

The invention relates to a cable processing device used to prepare cables. When preparing cables, the cable ends of cut-to-length and stripped cables are, for example, crimped, provided with grommets and/or fitted with plug housings.

BACKGROUND

A comparable cable processing device has become known, for example, from EP 1 447 888 A1. The cable processing device EP 1 447 888 A1 has a cable feed designed as a tape drive for moving the cable along a longitudinal axis of the machine. The stripping unit for cutting to length and stripping the cable ends is arranged on the longitudinal axis of the machine. Furthermore, the cable processing device has two crimping stations and two grommet stations as workstations. Because the crimp stations and grommet stations are located alongside the longitudinal axis of the machine, the cable needs to be guided from pivot units to the respective workstations by means of pivot arms provided with cable grippers, which is why this kind of cable processing device is also known and familiar to those skilled in the art under the name “pivot machine”.

SUMMARY

It is an object of the present invention to create a further improved cable processing device. The cable processing device is intended to make it possible to easily and efficiently produce various kinds of cables on the same device.

This object is achieved according to the invention with a cable processing device that is used to prepare cables and comprises at least one workstation for processing preferably stripped cable ends of the cables. Workstations may, for example, be crimp stations having crimping presses and/or grommet stations having grommet fitting modules. Processing modules other than the ones mentioned above may, however, also be used as processing modules for the workstations, such as sleeve fitting modules for fitting stripped strands with wire end sleeves, twisting modules for twisting the cable, tinning modules for tinning stripped cable ends or welding modules for welding the stripped cable ends.

The cable processing device preferably designed as a pivot machine may have at least one pivot unit with a cable gripper for handling the conductor ends for feeding a cable end of the cable to the respective workstation. If the cable is to be stripped on both sides and both cable ends are to be prepared, it is advantageous if the cable processing device has two pivot units, one of the pivot units being provided for handling the leading cable end and the other pivot unit being provided for handling the trailing cable end.

According to the invention, at least one of the workstations is designed as a changing station comprising two processing modules for optionally processing the cable end of the cable in one of the processing modules. The workstation designed as a changing station has an adjustment mechanism with which the processing modules allocated to the changing station can be adjusted between a working position and a waiting position. In the working position, the processing module is in a position in which the cable end can be processed in this processing module. In the waiting position, the processing module is in a position in which the processing module is at such a distance from the cable end that it is temporarily impossible for processing to take place.

The waiting position clearly corresponds to a type of parked position; in the working position, the processing module is ready for operation and this processing module can take part in an ongoing preparation process. Thanks to the changing station, the scope of the cable processing device is expanded. Various kinds of cables may be produced easily and efficiently on the same device. Long changeover times, as in the case of conventional cable processing devices, are no longer an issue.

If the workstation designed as a changing station only has two processing modules, then, if one of the processing modules is in the working position, the other processing module is in the waiting position. If more than two processing modules are provided for each changing station, the cable processing device is designed in such a way that, if one processing module is in the working position, all other processing modules of the changing station are in the waiting position.

The two processing modules of a changing station may be arranged on a common carrier, the carrier being mounted in a movable manner opposite a machine frame to create the aforementioned adjustment mechanism.

The machine frame is preferably stationary and is arranged or can be arranged in a standing position on the floor of a production plant. The aforementioned workstations designed as changing stations as well as, if applicable, the remaining or additional workstations of the cable processing device can be arranged on the machine frame.

The carrier can be mounted on the machine frame such that it is pivotable about a preferably vertical axis of rotation, whereby an advantageous adjustment mechanism is created. The processing modules may only be adjusted between the working position and the waiting position (and vice versa) by means of pivoting. This can be done manually or motorized via drive means.

Particularly preferably, the two processing modules are arranged opposite each other on the carrier in such a way that the processing modules of the changing station can be switched 180° by means of a rotating movement. As a result of the 180° rotation, one of the processing modules is moved from the working position to the waiting position, while the other processing module is simultaneously moved from the waiting position to the working position.

For advantageous handling and easy pivoting, the carrier may have a lever handle for pivoting the carrier for changing the processing modules of a changing station. Instead of manually pivoting the carrier, it would, however, also be conceivable to provide a drive, for example based on an electric motor, for pivoting the carrier. For automatic or at least semi-automatic operation, the drive could be connected to a control unit.

The carrier can have a plate-like design. For example, the carrier may be manufactured inexpensively from a steel plate. The carrier thus designed as a rotary plate can also be installed easily. Such a carrier may be used in a particularly versatile manner.

The respective processing modules of a changing station may be mounted on separate platforms. These platforms preferably have a plate-like design and are, in this case, also referred to hereinafter as “mounting plates”. By means of the platforms and, in particular, the mounting plates, it is particularly easy to place the desired processing modules on the cable processing device.

The platform may be displaceably mounted on the carrier via a linear guide. The platform and thus the processing module mounted on the platform can in this way be moved between an active position and a changing position. If the platform is in the changing position, changing the processing modules of the changing station is made possible, for example, by pivoting the carrier. If the platform (and the processing module mounted on the platform) is in the active position, this processing module can directly take part in the processing for preparing cables.

Particularly preferably, the linear guides for the processing modules for moving the platforms are arranged parallel to a changing station.

Each platform may have a pull handle for moving the platforms with the respective processing modules. The pull handle may, for example, be a ball handle that makes it possible to easily and manually move the platforms. As an alternative to the manual design, a drive unit with which the respective platform can be moved after corresponding activation may also be provided.

The changing station could have a locking device with which pivoting or, if need be, a different movement of the carrier is rendered impossible if at least one platform of a processing module in the working position is in the active position. In this way, secure operation of the cable processing device can be ensured.

To form the locking device, a groove may be provided in the carrier in which an engagement element, for example, in the form of a roller, can be moved to the active position when the platform is moved. Alternatively, a groove may be provided in the platform in which an engagement element allocated to the carrier can be moved to the active position when the platform is moved.

It can also be advantageous if securing means are provided for securing the platform in an active position. Unintentional movement of the respective platform from the active position can thus be prevented in a simple manner.

The securing means can have a clamping unit with a clamping part that applies a clamping force to the platform to secure it in the active position. The securing means could alternatively also comprise locking pins. Means for creating a snap-in connection for securing the active position would also be conceivable.

To increase personal safety, it is advantageous if the cable processing device has a protective hood for securing the working area of a working module that is in the working position. The protective hood may be designed in such a way that the working module(s) of the changing station that are not in the working position are arranged outside of the protective hood. This arrangement ensures that the waiting processing modules can be prepared during operation or that new processing modules can be installed without interrupting operation.

The protective hood may be moved between a closed position and an open position to permit switching from one processing module to another processing module of the changing station. The protective hood is particularly advantageously designed so that it can be moved in a vertical direction between the closed position and the open position.

Depending on requirements, the changing station may have similar types or different types of processing modules. For example, the changing station may have two grommet stations or two crimping stations. However, the changing station could, for example, also be composed of a crimping station and a grommet station.

The processing modules of a changing station can be chosen from a group comprising a crimping press for producing a crimp connection, a grommet module for fitting the stripped cable end with a grommet, a sleeve fitting module for fitting the stripped cable end with a wire end sleeve, a tinning module for tinning the stripped cable end and a welding module for welding the stripped cable end, for example using an ultrasonic welding or resistance welding method. A sleeve fitting module would, for example, make it possible to quickly switch the production from crimped contacts with a grommet to wire end sleeves.

DESCRIPTION OF THE DRAWINGS

Additional advantages and individual features of the invention are derived from the following description of an exemplary embodiment and from the drawings. Shown are.

DETAILED DESCRIPTION

Figure 1:
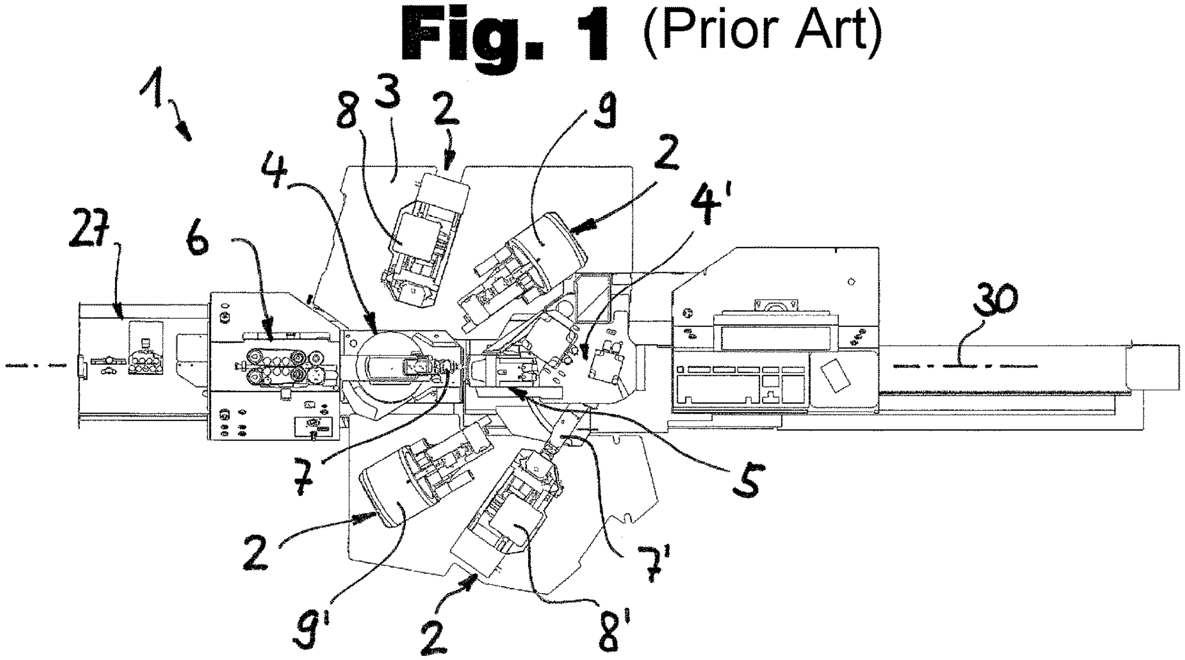
Fig. 1 (Prior Art)
FIG. 1 is a plan view of a cable processing device designed as a pivot machine having a plurality of workstations according to the prior art.

FIG. 1 shows a prior art cable processing unit identified as a whole by reference number 1 for preparing cables (not depicted). During the preparation explained here by way of example, the cable ends are initially cut to length and stripped, then crimped and provided with grommets.

The cable processing device 1 has a frame 3 and comprises a cable conveyor device 6 designed as a conveyor belt, which moves the cable along a longitudinal axis 30 of the machine 1 to pivot units 4, 4'. A stripping unit 5 cuts the cable to length and the two cable ends are stripped. The stripping station 5 is clearly on the longitudinal axis 30 of the machine 1. The other workstations, identified by reference number 2, are next to the longitudinal axis 30 of the machine in the top view. A straightening unit 27, which is also on the longitudinal axis 30 of the machine, is arranged in front of the cable conveying device 6.

The cable processing device 1 is designed as a pivot machine and has the two pivot units 4 and 4'. The pivot units 4, 4', which can be rotated about vertical axes, each have a cable gripper 7, 7' for holding the cable. The respective cable ends can be fed to the workstations 2 with the cable grippers 7, 7' of the pivot units 4, 4'.

In the embodiment variant according to FIG. 1, the cable processing device 1 has four of the workstations 2. Two workstations are provided in each case for processing a leading cable end and for processing a trailing cable end. The workstations are designed as grommet stations and crimping stations and have the crimping presses 8, 8' and the grommet modules 9, 9'. The crimping press identified by the reference number 8, and the grommet module identified by the reference number 9 are used to process the leading cable ends and work together with the pivot unit 4 having the cable gripper 7. The two workstations 2 on the other side are used to prepare the trailing cable end; these workstations 2 are the crimping press identified by the reference number 8' and the grommet module identified by reference number 9'.

The cable processing device 1 according to the example from FIG. 1 is especially suited for the production of cables that are prepared in a similar way. If new or other prepared cables are to be produced, for example, when a different type of grommet is to be processed, corresponding conventional workstations 2 need to be converted and set up again. To convert and set up the grommet modules 9, 9', the production needs to be stopped so that the grommet modules can be converted and set up again, which results in relatively long down times. Novel workstation 2, which is explained in detail below and shown in FIG. 2, makes it possible to quickly change from one grommet type to another grommet type.

Figure 2:
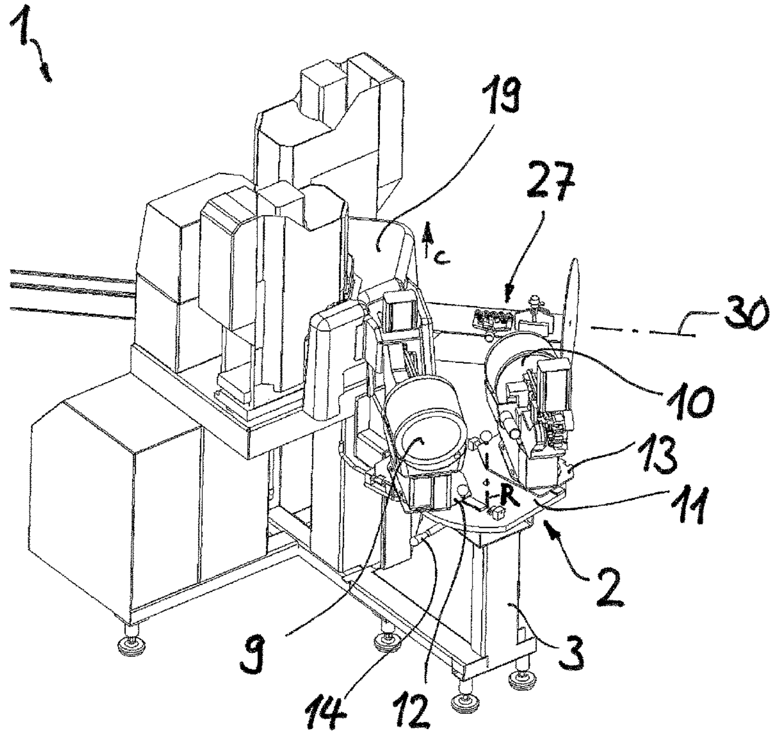
FIG. 2 is a perspective view of a workstation designed as a changing station for the cable processing device according to the invention.

The grommet station 2 of the cable processing device 1 according to FIG. 2 is designed as a changing station and has two grommet modules 9 and 10 for optionally fitting a cable end with grommets in one of the grommet modules 9, 10. Such a workstation designed as a changing station may be part of a cable processing device 1 of the type shown in FIG. 1 following corresponding adaptation. It is also conceivable that existing conventional cable processing devices 1 are retrofitted with such changing stations.

Instead of the grommet modules 9, 10 shown in FIG. 2, other processing modules could of course also be used for the workstation 2 designed as a changing station. Processing modules for the changing station 2 can be, for example, crimping presses, sleeve fitting modules, twisting modules, tinning modules and/or welding modules.

FIG. 2 shows a first grommet module in a working position identified by the reference number 9. In this position, grommets from this first grommet module 9 can be placed on cable ends. The second grommet module, identified by the reference number 10, is in a waiting position. This second grommet module 10 can, in comparison to the first grommet module 9, be loaded with other grommets.

Figure 5:
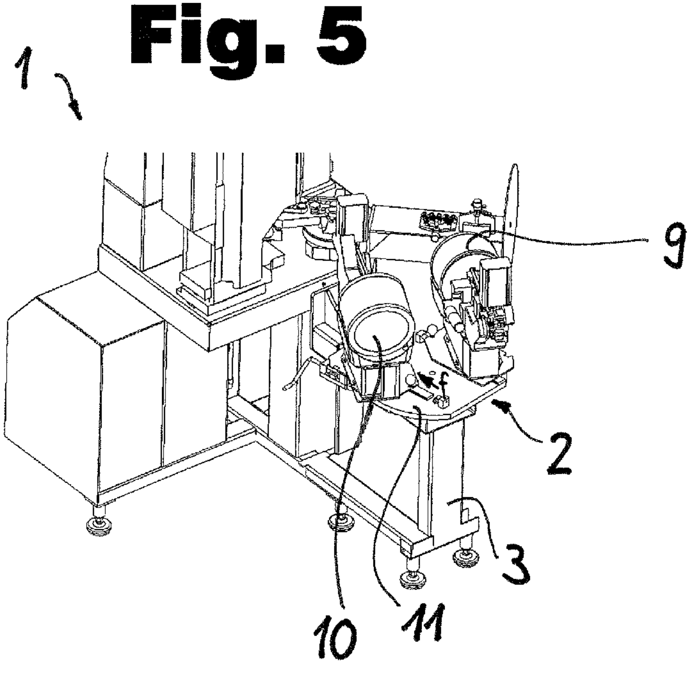
FIG. 5 shows the workstation with open protective hood after the changing of the processing modules of the changing station is complete.

As soon as it is necessary to change to a different grommet, the grommet module 9 is moved from the working position to a waiting position while the second grommet module 10 is simultaneously moved from the waiting position to the working position (see FIG. 5). An adjustment mechanism is provided for changing the processing modules 9 and 10 of the changing station 2. This adjustment mechanism comprises a carrier 11 on which the two grommet modules 9, 10 are arranged. The carrier 11 is mounted on a machine frame 3 such that it is pivotable about the vertical axis of rotation identified by R. The two grommet modules 9, 10 are arranged opposite each other on the carrier 11 in such a way that the grommet modules 9, 10 can be moved back and forth between the working position and waiting position by pivoting 180°. Respective processing modules 9, 10 of the changing station are mounted on separate platforms 12, 13, which can be moved back and forth between an active position and a changing position.

Figure 3:
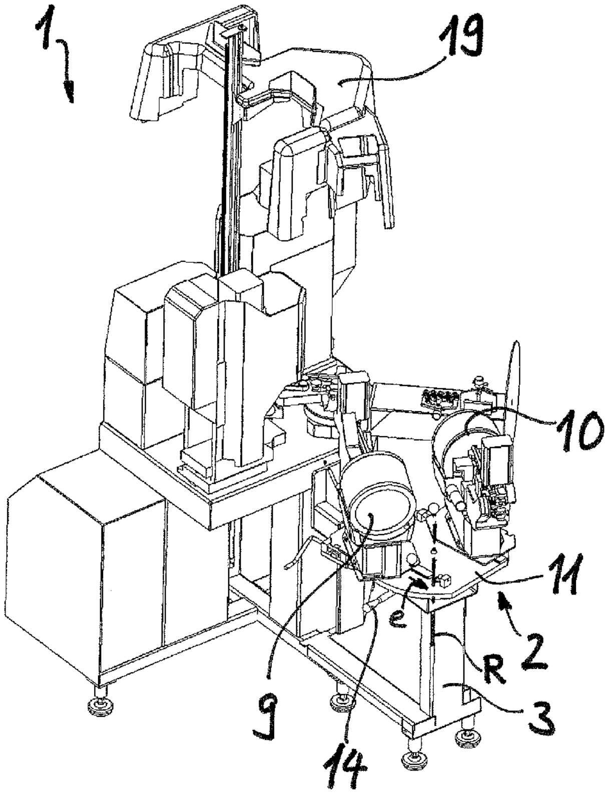
FIG. 3 shows the workstation from FIG. 2, but with the protective hood open.

A change of the grommet modules 9, 10 can proceed as follows: The operation of the cable processing device 1 is stopped before the beginning of the changing process. A protective hood 19, which covers the working area of grommet station 9, can now be opened. The opening movement for the protective hood 19 is indicated by an arrow c. In FIG. 3, the changing station 2 is shown with an open protective hood 19.

Figure 4:
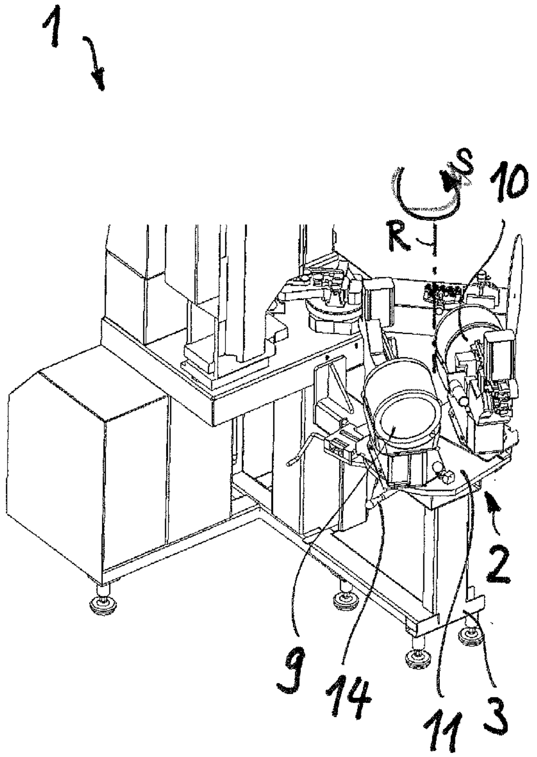
FIG. 4 shows the workstation according to FIG. 3, where a processing module that was previously in an active position has been moved to a changing position.

Afterwards, the grommet module 9 is moved to the changing position by displacement in the e direction. The grommet module 9 displaced in such a way is shown in FIG. 4. Now, as a result of being pivoted 180°, the grommet station 9 can be moved from the working position to the waiting position. The pivoting movement is indicated by an arrow s. After the grommet module 10, which was pivoted to the working position in such a way to establish an active position, has been moved to the pivot unit in the direction of an arrow f (FIG. 5) and the protective hood 19 has been lowered again, the cable processing device 1 is ready for operation again. Grommets from the grommet module 10 can now be processed.

Figure 6:
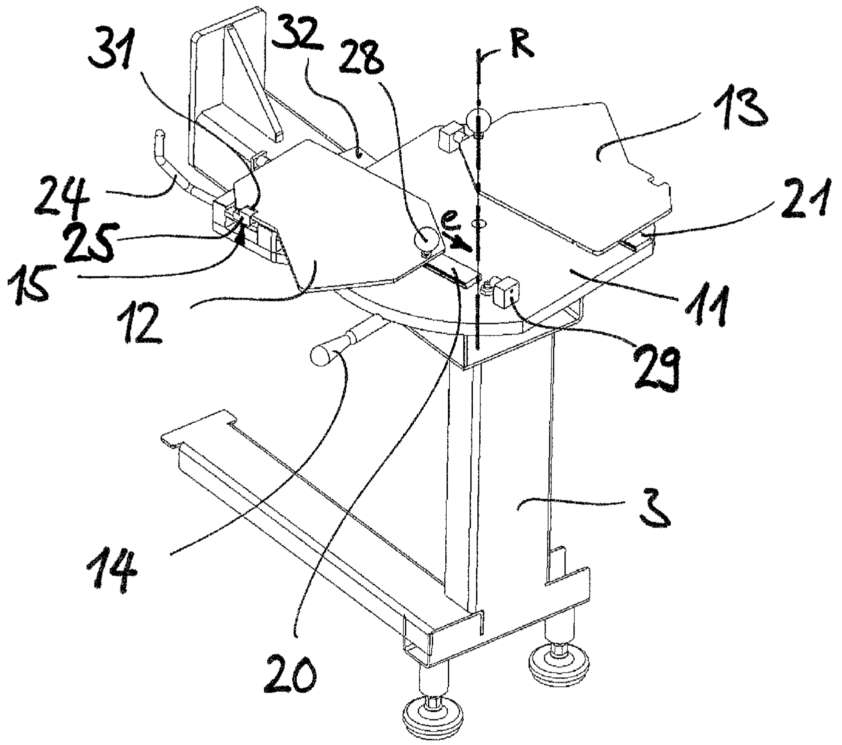
FIG. 6 is a perspective view of a changing station (without processing modules) having a pivoting carrier and displaceably mounted platforms thereupon, on which processing modules can be mounted.
Figure 7:
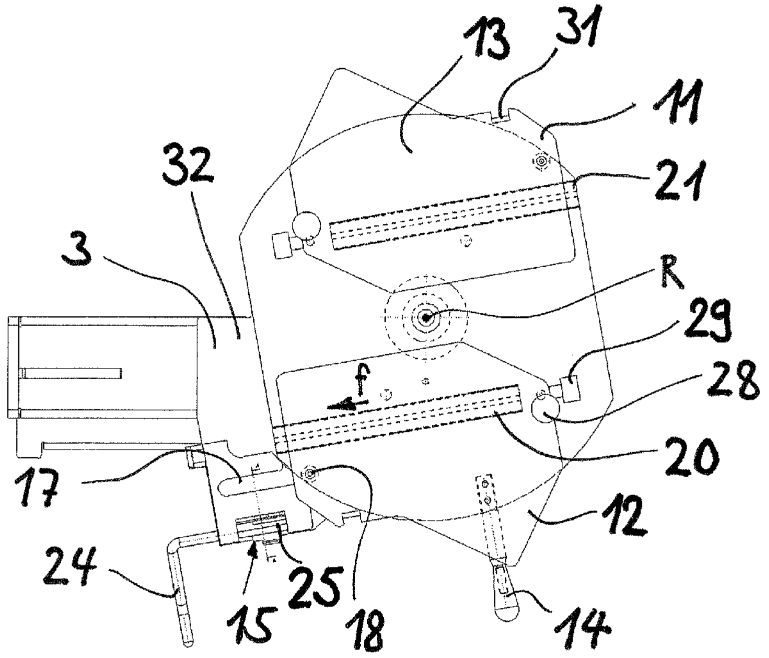
FIG. 7 shows the changing station from FIG. 6 in a top view having platforms for the processing modules, each of which is in a changing position.
Figure 8:
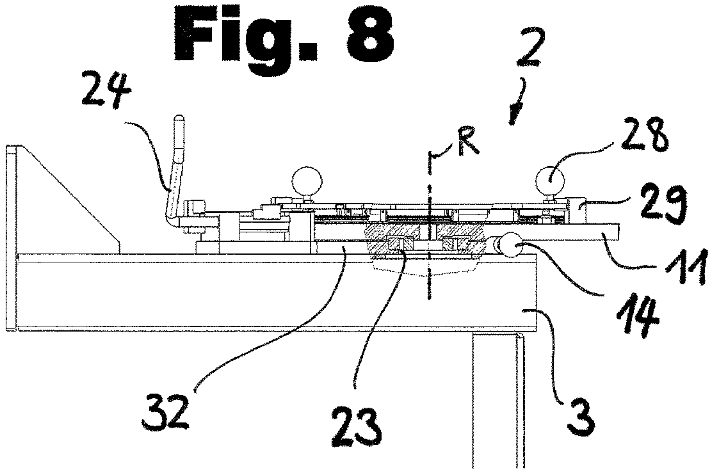
FIG. 8 is a side view of a changing station with a partial sectional view.

Design details for the design of the changing station 2 are shown in FIGS. 6 to 8. To provide a better understanding of the structure and mode of operation, the respective operating modules (9, 10) are not shown in these figures. The obviously plate-like carrier 11 is pivotably mounted on the machine frame 3. For easy, manual pivoting, a lever having a guide handle 14 is arranged on the side of carrier 11.

Linear guides 20, 21, which are formed by rail-shaped profiles on the upper side of the carrier 11, are used for the displaceable mounting of platforms 12, 13. The second platform 13 is designed identically to the first platform 12 in terms of structure and functionality. The platform 12 for the processing module in the working position is shown in the active position in FIG. 6. To secure the platform 12 in the active position, a clamping unit 15 is provided that securely holds the platform 12 in this position. To release the platform 12, the clamping unit 15 is connected to a lever 24 that is pivotable downward. Once the platform 12 is released from the clamping unit, the platform 12 can be moved in an e direction to establish the changing position. A stop 29 is provided at the end of the linear guide 20 to limit the displacement path.

In the top view according to FIG. 7, the platform 12 is in a retracted waiting position. Ball handles 28, which make it possible to move the respective platform 12, 13 with one hand, are used to move the platforms 12, 13. The carrier 11 includes a groove 17 in which a roller mounted to a bottom side of the platform 12 facing the carrier is arranged. A roller 18 forms an engagement element that can be introduced into the groove 17 when the active position is established by means of displacement in the f direction. In the waiting position of the platform 12 shown in FIG. 7, the roller 18 is unaffected, whereby it is possible to pivot the carrier 11 to change the processing modules.

The pivotable carrier 11 is on a support plate 32 that is attached to the machine frame 3. As can be further recognized from the sectional view in the central part of FIG. 8, the changing station 2 has a roller bearing 23 for mounting the carrier 11 such that it is pivotable.

Figure 9:
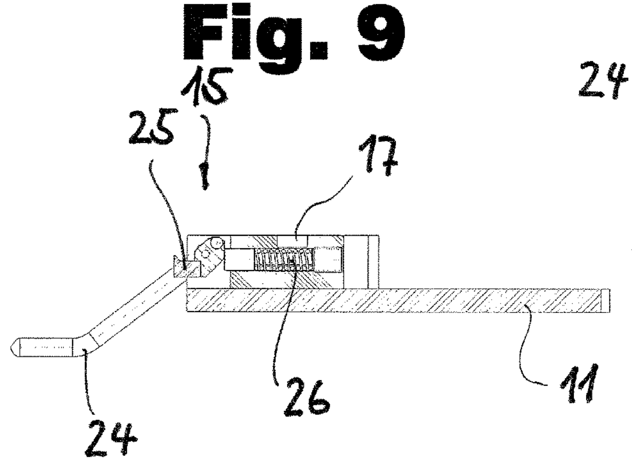
FIG. 9 is a sectional view of an open clamping unit for securing a platform in an active position.
Figure 10:
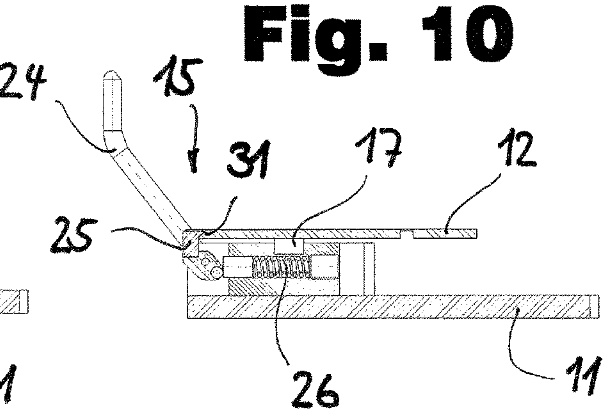
FIG. 10 shows the clamping unit of FIG. 9 closed.

FIGS. 9 and 10 show details of the clamping unit 15 for securing the platform 12 (or 13) in the active position. The clamping unit 15 has a clamping part 25 with a nose that is triangular in its cross section and can be moved from the open position (FIG. 9) to the closed position (FIG. 10) after the lever 24 is pivoted upward. In the closed position according to FIG. 10, the nose of the clamping part 25 engages in a chamfer 31 (see also FIG. 7) that is arranged at the lateral edge of the platform 12, whereby the platform 12 is secured and unintentional displacement is rendered impossible. A compression spring 26 causes a preloading force to reliably hold the clamping part 25 in the closed position.

A proximity sensor that responds when the clamping unit 15 is closed can be placed next to the chamfer 31. A control unit of the cable processing unit 1 can thus detect which processing module is in the active position and whether it is locked there by the clamping unit 15.

FIG. 10 shows that the platform 12 has a plate-like design for mounting the processing module (not depicted). For this reason, the platforms 12, 13 are also referred to as "mounting plates". Two identical mounting plates, on which the necessary processing modules are mounted, are arranged on the carrier 11, the mounting plates 12, 13 being displaceable on the carrier 11 by means of the linear guides described above. This linear motion is necessary to be able to carry out the pivoting motion without collisions. However, embodiment variants having platforms that are securely connected to the carrier are conceivable because the linear motion can be omitted for machines having less confined space conditions.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A cable processing device having at least one workstation for processing cable ends of cables comprising:

two processing modules, each processing module for processing a cable end of a cable in a working position; and the at least one workstation being a changing station having an adjustment mechanism for selectively simultaneously moving one of the processing modules between the working position and a waiting position and another of the processing modules between the waiting position and the working position.

2. The cable processing device according to claim 1 wherein the processing modules are arranged on a carrier, the carrier being movably mounted on a machine frame.

3. The cable processing device according to claim 2 wherein the carrier is pivotally mounted on the machine frame for pivoting about a vertical axis of rotation.

4. The cable processing device according to claim 2 wherein the carrier includes a lever handle for pivoting the carrier to selectively move the processing modules into the working position.

5. The cable processing device according to claim 2 wherein the processing modules are mounted on separate platforms.

6. The cable processing device according to claim 5 wherein each of the platforms is displaceably mounted on the carrier via a linear guide.

7. The cable processing device according to claim 5 further comprising a clamping unit for securing the platforms in an active position.

8. The cable processing device according to claim 7 further comprising a locking device preventing pivoting of the carrier if one of the platforms in the working position is in the active position.

9. The cable processing device according to claim 8 wherein the locking device includes a groove formed in the carrier and an engagement element that is introduced into the groove when the platform in the working position is moved to the active position.

10. The cable processing device according to claim 9 wherein the engagement element is a roller.

11. The cable processing device according to claim 1 further comprising a protective hood for securing a working area of one of the processing modules that is in the working position, the protective hood being configured such that another one of the processing modules that is not in the working position is arranged outside of the protective hood.

12. The cable processing device according to claim 11 wherein the protective hood is movable between a closed position and an open position to permit switching from one of the processing modules to another of the processing modules.

13. The cable processing device according to claim 1 wherein the processing modules are similar types or are different types.

14. The cable processing device according to claim 1 wherein each of the processing modules is one of a crimping press, a grommet module, a sleeve fitting module, a tinning module and a welding module.

* * * * *